United States Patent [19]
Matheu

[11] 4,053,963
[45] Oct. 18, 1977

[54] PORTABLE APPARATUS FOR USE IN THE TREATMENT OF SLAUGHTERED ANIMALS

[76] Inventor: Guillermo R. Matheu, 2a Arenida 9-03 Zona 9, Guatemala City, Guatemala

[21] Appl. No.: 645,310

[22] Filed: Dec. 29, 1975

[51] Int. Cl.² ............................................. A22B 5/00
[52] U.S. Cl. .......................................... 17/1 R; 17/51; 27/24 R; 99/532
[58] Field of Search ............. 17/51, 45, 1 R, 1 C; 27/22 R, 22 A, 24 R, 24 A; 99/532, 533, 535

[56] References Cited

U.S. PATENT DOCUMENTS

| | | | |
|---|---|---|---|
| 2,013,156 | 9/1935 | Jones et al. | 27/24 R X |
| 2,388,337 | 11/1945 | Moody | 27/24 R X |
| 2,626,446 | 1/1953 | Moore | 27/24 R |
| 3,528,146 | 6/1968 | Markarian et al. | 27/24 R |

FOREIGN PATENT DOCUMENTS

| | | | |
|---|---|---|---|
| 870,717 | 5/1971 | Canada | 27/24 |
| 565,011 | 11/1932 | Germany | 17/51 |

Primary Examiner—F. Barry Shay
Attorney, Agent, or Firm—Misegades, Douglas & Levy

[57] ABSTRACT

A portable apparatus having a tank having an internally treated surface for containing at least 500 liters, a pump connected to the exit of the tank for pumping solution to a nozzle through a reducing coupling, a water meter means for controlling the quantity of solution entering the steer, a cut-off valve at the water meter, and a cut-off valve at the nozzle, a manometer means for reading pressure passing through the system which is substantially equal to or greater than the pressure developed in the animal's arterial system, and a return pipe from the pump to the tank. By means of the present invention there is provided means for injecting solution into a slaughtered animal when a veterinarian, who controls the quantity of the solution administered according to the weight of the animal such as a steer, and, when the appropriate amount of solution has entered and passed through the steer, the veterinarian closes his valve and the nozzle is shut and removed from the slaughtered animal. While the solution is coursing through the animal, the remaining and residual blood can be seen exiting the animal through severed hind legs and jugular vein. Once the blood is forced out the solution can be seen exiting the animal and the treatment of the slaughtered animal is complete.

8 Claims, 1 Drawing Figure

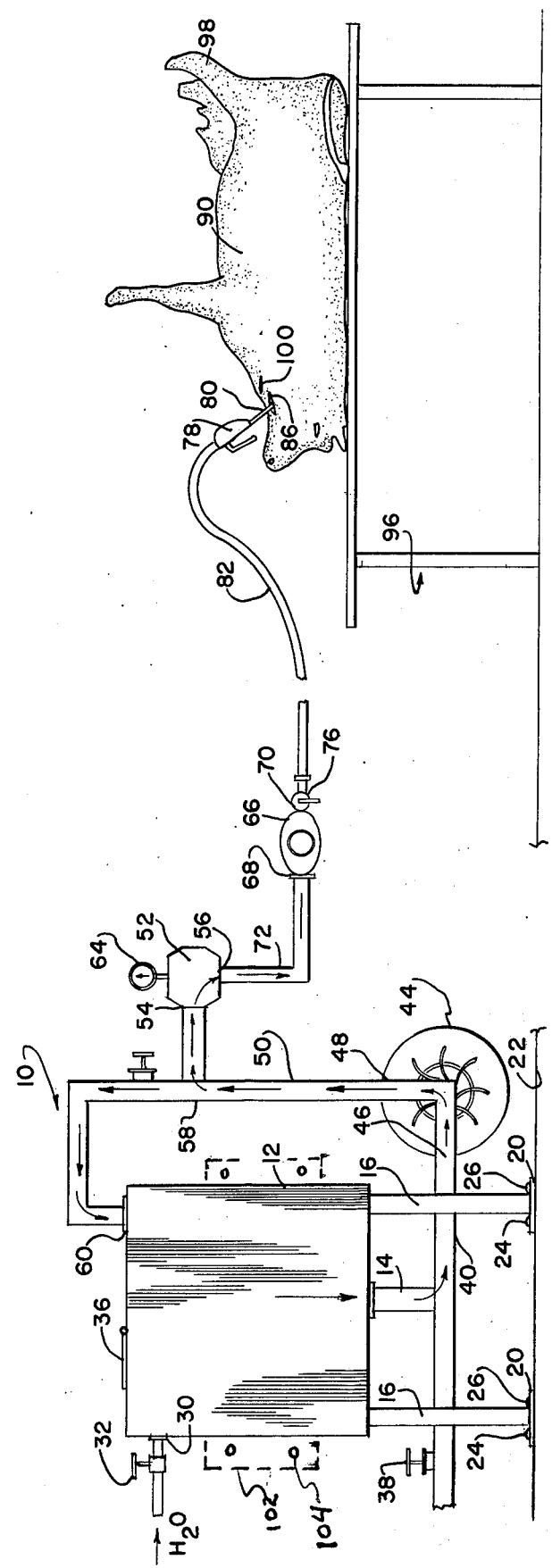

PORTABLE APPARATUS FOR USE IN THE TREATMENT OF SLAUGHTERED ANIMALS

CROSS REFERENCE TO RELATED DATA AND INFORMATION

The present invention is related to and is an improvement over certain prior art patents including Dekker U.S. Pat. No. 2,863,777 which teaches a meat coloring preserving composition containing glucose, ascorbic acid and nicotinic acid applied by injection into meat, Schoemaker, British Pat. No. 802,126 which is similar to Dekker, and a Barnett patent Canada No. 573,378 which suggests and discloses arterial pumping meat-curing solutions containing phosphates and other ingredients warmed to approximately 60° F. Of further cursory interests in Wasserman U.S. Pat. No. 2,812,261 showing meat-curing compositions which inhibit color changes in cured meat and thus preserves a red color by use of a mixture of sodium ascorbate and phosphates. Comparable patents are those such as the applicant having patents in Guatemala including Certificado de petente precautoria numero 277, Apr. 16, 1970 relating to a "new method for obtaining better quality of meat"; patent registration No. 519,494; registration No. 208,678; and Guatemala Pat. No. 2306 of June 17, 1971. This application is a co-pending application of the applicant herein who concurrently filed an application titled "Composition And Method For Preparing Meat," filed Dec. 29, 1975 having Ser. No. 645,309.

Other Registrations in Guatemala of more cursory interest and value are: Registry No. 231,323 (No. A 227158) Of Feb. 18, 1972: Registry No. 112199 (No. G1 - 3575760) of Mar. 1, 1972; Servicio Consular Mexicano No. 424,323/129 in Guatemala of Mar. 3, 1972; and Guatemala patent granted Feb. 3, 1973 on "Method for Vitamizing and Tenderizing Beef Meat."

BRIEF SUMMARY OF THE INVENTION

The present invention relates to an improved portable apparatus for use in the treatment of slaughtered animals, and more particularly the invention relates to a system of apparatus that is useful in the treatment of slaughtered animals, whether they be beef, including steers, hogs, chickens, deer, buffalo and the like. Particularly it should be pointed out that this invention is capable of using the solution and composition and the method for preparing meat described and disclosed in the co-pending application, and this application relates to the apparatus, in which the preferred embodiment is that of a portable apparatus but it may as well be mounted for securing in a permanent location and from a permanent surface or platform.

It should be described and disclosed here that the procedure using the present apparatus and preferred embodiment of the invention is set forth hereinbelow. For example a steer which is to be prepared into meat for consumption, the procedure is to provide means for stunning the steer with a knocker and then to support or hang the steer from its hind leg or legs. The jugular vein of the steer is then severed from the right side and the animal is de-bleeded. The steer is then layed horizontally upon a bed or table with all of its legs extending upwardly. The hind legs are then removed at the knee joint. The throat of the animal is opened with a small incision, approximately 3 inches long and when the main vein or artery is located there is inserted or injected therein the nozzle of the portable apparatus described above. A veternarian controls the quantity of the solution administered according to the weight of the steer and this is done by opening the valve at the water meter location. He may signal the man positioned at the steer and table who in turn opens the valve at the nozzle and when the appropriate amount of solution has entered the steer, the veternarian closes the valve at his position and the nozzle is then shut off and removed from the animal. While the solution is coursing through the steer, the remaining and residual blood within the animal can be seen exiting the animal through its severed hind legs and the jugular vein at the incision. Once the residual blood is forced out of the animal, then the solution proceeds to exit the animal and this is observed visually, and the system is shut down and turned off.

FIELD OF THE INVENTION

There are existing methods and apparatus for treating meats and processes for treating meats as well as there are many prior methods for achieving improvement in slaughter of animals for purposes of butchering. Up to now, efforts to improve the quality, production and appearance of slaughtered animals such as beef and the like are primarily directed to the use of solutions for treatment after the meat has been butchered. These efforts have not given all of the desired results and advantages sought to be set forth and achieved in the present invention and it has been found that these prior art methods maintain results in which the meat appears to fatty and less attractive as well as being generally tough in consistency. The present invention seeks to resolve these problems and is essentially based upon a new method, composition and apparatus for the treatment of slaughtered animals and prior to the process of butchering the animal. Within the purport of the present invention, each slaughtered animal which had just been killed is placed under treatment according to the purport of the present invention by treatment including insertion of a nozzle within a slitted main vein or artery of the animal and injecting a composition through the principle vein or artery or in some cases a principle or main vein. Within the purview of the present invention, a solution or composition is transmitted through the slaughtered animal so that all of the residual blood accumulated in the animal is cleared out of its veins and arteries, as well as muscles, and the like, and using the spasms of the dying animal. After this is accomplished the animal is then transported to room at room temperature for 6-8 hours or to a refrigeration room at essentially 0° C. where it is stored until it is time fo butchering the meat further.

It is therefore an object and advantage of the present invention to provide apparatus for instituting a method for vitaminizing and tenderizing beef in accordance with a new and improved apparatus.

Another object and advantage of the present invention is to provide a new and improved method for injection into a slaughtered animal by means of a apparatus of the present invention for the treatment of animals recently slaughtered in order to produce improved grade and quality of meat for human consumption by making it more attractive in color and consistency as the composition is injected and circulates through the animal.

Another object and advantage of the present invention is to offer and provide a new composition for the treatment of recently slaughtered animals in order to have more tender meat when cutting it without further use of expensive tenderizers and without using salt or other similar condiments.

BRIEF DESCRIPTION OF THE SEVERAL VIEWS OF THE DRAWING

The above and other objects and advantages of the invention will become apparent upon full consideration of the following detailed description and accompanying drawings in which:

The FIGURE shows a side elevation view partially in cross-section of an improved protable apparatus for use in the treatment of slaughtered animals according to the best mode and preferred embodiment of the present invention.

DETAILED DESCRIPTION OF THE PREFERRED EMBODIMENT

Referring now to the drawing there is shown a portable apparatus 10 to be described for use in the treatment of slaughtered animals which includes a closed container or tank 12 having at least an outlet 14 in the bottom thereof and which is supported by at least a set of four supports or leg members 16, 16. At the lower ends of the legs 16, 16 there is provided a base plate 20, 20 which may be secured firmly to a supporting surface 22 by means of bolts or securing means 24, 26.

The tank is constructed of any conventional size and dimensions and is preferably one having a protective inner lining therein (not shown) or the tank may be constructed of stainless steel plates so that the size of the tank may contain at least or in the excess of about 500 liters. There is provided at one side of the tank an inlet 30 for the entry of water when a valve 32 is opened, but which is otherwise closed.

It should be mentioned here that the tank is used for forming a solution and composition within the purport of the disclosure set forth and described in the applicant's co-pending application herein mentioned above, and the composition is inserted into tank 12 through a hinged-mounted hatch element 36 for adding composition within the tank for constituting the solution for use in the preparation and treatment of the slaughtered animal.

All of the tubing is galvanized and properly protected for safe usage.

While the outlet 14 of the tank may be used to drain off the tank when a drain valve 38 is open for flushing out the tank and the system, ordinarily during the course of the operation of the portable apparatus the drain valve 38 is closed and the tank communicates directly by means of pipe 40 to a pump 44 having an intake opening 46 and an outlet flow orifice 48 so that when the pump is driven, solution from the tank is transmitted upwardly through pipe 50 and thence to a reducing means 52 having an inlet 54 and an outlet 56. Of course it is within the purview of the present invention to provide a recycling connection from the pipe 50 commencing at a T-connection 58 for recycling or returning a large portion of the solution transmitted from the pump 44 to a return entry 60 in the tank 12. In the FIGURE the re-entry 60 is shown as disposed at a top portion of the tank and receives the recirculating fluid so that a large portion of the fluid passes again to the tank in keeping with the concept of having the solution sufficiently and constantly mixed, while a small portion passing through the reducing means 52 due to the pipesize reducing means afforded thereby.

There operatively mounted and intercoupled to the reducing means 52 a manometer 64 for providing indications and visual readings of the pressure of the solution within the reducing means. From the outlet 56 a pipe is shown to extend to a water meter device 66 having inlet 68 and outlet 70 and being operatively mounted and intercoupled by conduit means 72 from the reducing means 52. The water meter means 66 provides means for visually indicating the quantity of fluid that may pass through the meter at any given time. It is within the purport of the present invention to have the meter run on a continuing scale or to have it capable of being reset to 0 for the commencement of each surge of water passing through the water meter 66, as is well known in the art. From the outlet 70 there is a cut-off or ON-OFF valve 76 to which is coupled a flexible conduit which terminates in a further cut-off or ON-OFF valve 78 which in turn is operatively coupled to a nozzle 80.

In use of the present apparatus within the preferred and best mode of the invention, the nozzle 80 is disposed for being of such a size and dimension for being inserted and injected into an opened small incision in the main artery 86 of a slaughtered animal 90 resting on its back upon a constructed bed frame or table 96. As is shown demonstratively in the FIGURE, the slaughtered animal 90 may be a steer, cow or similar bovine type species, a deer, chicken, hog, buffalo and the like, and the solution from the tank 12 passes through the apparatus 10 so that the solution including the composition in measured quantities determined by the water meter 66 is injected into the animal 90 and courses through the animal for substantially exhausting the residual blood therein and until it passes therefrom, for example from arteries in the animal's hind legs 98, particularly when the hind legs are severed at the knee joint as shown in the FIGURE thus when the solution has coursed through the animal then when the blood has been washed from the severed hind legs 98 and/or jugular vein 100 in the neck of the animal, then the solution passes therefrom in a quite clear condition.

The pump 44 may be a 1½ HP turbine electrical pump capable of reducing 35–40 pounds pressure per square inch which is found to be equal or slightly in excess of the arterial pressure of a bovine animal, steer, cow and the like and thus the solution courses through the animal in essentially standard circumstances. The water meter 66 is operated by a veterinarian who is capable of controlling the amount of water so that there is a controlled quantity of solution entering each animal. The flexible hose or conduit 82 may be of polypropylene plastic or similar material.

Water that is used to fill the tank 12 through the inlet 30 is usually filtered and purified by means (not shown) before being mixed with chemicals and this is accomplished in usual and well known manner and by conventional apparatus.

It is within the purview of the present invention to provide means and methods of cleaning the tank pipes by vapor cleaning means daily, for example, before and after use, and the conventional and usual bacteriological tests that are used in the trade have proofed negative.

By means therefor for the present invention it is seen that for example a steer that is stunned with a knocker and hung from its hind legs. Then its jugular vein is severed from the right side of the animal and it is debleeded. The animal is then layed horizontally on the bed 96 with its legs extending upwardly. The hind legs are removed or severed at the knee joint 98 and the throat is opened with a small incision of about 3 inches in length so that the main vein or artery 86 is cut and the nozzle 80 is inserted and injected into it. A veterinarian positioned at the water meter 66 controls the quantity of the solution administered and this is done in accordance with the normal weight of the animal being treated, and in some cases the calibration of the water meter 66 may show a scale ancillary to the quantity of the scale readings the suggested weights of the animal being treated so that it is clear in all cases the manner in which the time interval is used for metering solution to the treated animal. The valve 76 is opened and shut to initiate and terminate the quantity of solution to be directed and transmitted to the animal. When the appropriate amount of solution has entered the steer, then the veterinarian closes the valve 76 or the operator at the animal position closes the valve 78 and then the nozzle 80 is removed. While the solution is still coursing through the animal, which coursing is assisted by the reflex muscles, and peristaltic action of the veins and other muscles in passing the solution through the animal till all of the blood is forced out and it is exited from the animal through its severed hind legs and the jugular vein 100. After the blood is forced out then there is seen merely the solution that is exiting the animal.

The invention may include a heater 102 and heater elements 104 disposed for surrounding the tank so that preparation of the solution and maintenance of the solution is at a temperature elevated above room temperature of the body heat of the slaughtered animal, for example, at 15° C to 39° C.

Within the purview of the use of the apparatus of the present invention it is found that the apparatus provides for total and equal distribution of the concentration solution throughout or essentially throughout the entire animal by insertion of the nozzle in the main vein or artery for injecting the solution therein.

Additional embodiments of the invention in this specification will occur to others and therefore it is intended that the scope of the invention be limited only by the appended claims and not by the embodiment(s) described hereinabove. Accordingly, reference should be made to the following claims in determining the full scope of the invention.

What is claimed is:

1. A portable apparatus (10) for use in the treatment of slaughtered animals by administering liquid solution thereto according to the weight of the animal, said apparatus essentially comprising a tank (12), with an outlet (14) in the bottom, a pump (44) having an intake opening (46) and an outflow orifice 48, a pipe connecting from the outlet of the tank to the intake opening of the pump, a pipe-size reducing means (52) having an inlet and an outlet (56), a pipe connecting from the outflow orifice of the pump to the inlet of pipe-size reducing means, a manometer operatively mounted and coupled to the pipe-size reducing means for indicating visually the pressure of liquid therein, water meter means having an inlet and an outlet and operatively mounted and coupled by conduit means from the outlet of the pipe-size reducing means to the inlet of the water meter means for indicating visually the quantity of liquid passing there through, an ON-OFF valve (76) coupled to the outlet of the water meter means, a flexible conduit coupled from the ON-OFF valve to a nozzle, and a further ON-OFF valve (78) operatively mounted and coupled at the nozzle.

2. The invention of claim 1 wherein said tank is of stainless steel.

3. The invention of claim 1 wherein said nozzle is disposed for being inserted and injected into an opened small incision in the main vein or artery (86) of a slaughtered animal (90).

4. The invention of claim 1 wherein said apparatus is mounted upon legs having a base plate (20) interfacing with a supporting surface (22), said base plate having means for being secured to a supporting surface.

5. The invention of claim 1 wherein said tank has an inlet and valve means for the selective ingress of filtered and purified water into the tank and a hatch for opening for adding composition for use in the preparation and treatment of meat.

6. The invention of claim 1 including a table (96), on which a slaughtered animal is laid for processing liquid through it for preparing and treating it for human consumption.

7. The invention of claim 1 wherein a return line is interconnected between the outflow orifice of the pump and a top portion of the tank for recirculating the liquid so that a large portion of the liquid passes again to the tank in keeping the solution sufficiently constantly mixed.

8. The invention of claim 1 wherein heater means are disposed about the tank for elevating the liquid in the tank to a temperature of the body heat of the slaughtered animal such as between 15° and 39° C.